(12) United States Patent
Topfer et al.

(10) Patent No.: US 9,725,931 B2
(45) Date of Patent: Aug. 8, 2017

(54) ACTUATING UNIT FOR A MOTOR VEHICLE LOCK AND CORRESPONDING METHOD OF PRODUCTION

(71) Applicant: Kiekert Aktiengesellschaft, Heiligenhaus (DE)

(72) Inventors: Claus Topfer, Sindelfingen (DE); Winfried Schlabs, Bochum (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 14/434,130

(22) PCT Filed: Sep. 6, 2013

(86) PCT No.: PCT/DE2013/000508
§ 371 (c)(1),
(2) Date: Apr. 28, 2015

(87) PCT Pub. No.: WO2014/056468
PCT Pub. Date: Apr. 17, 2014

(65) Prior Publication Data
US 2015/0267440 A1    Sep. 24, 2015

(30) Foreign Application Priority Data

Oct. 12, 2012    (DE) .................. 10 2012 218 650

(51) Int. Cl.
*E05B 81/32*    (2014.01)
*F16C 1/26*    (2006.01)
(Continued)

(52) U.S. Cl.
CPC .............. *E05B 81/32* (2013.01); *E05B 79/20* (2013.01); *E05B 81/25* (2013.01); *F16C 1/145* (2013.01);
(Continued)

(58) Field of Classification Search
CPC .......... E05B 79/20; E05B 81/25; E05B 81/28; E05B 83/16; E05B 83/36;
(Continued)

(56) References Cited

U.S. PATENT DOCUMENTS 2,796,755 A * 6/1957 Craig ...................... E05B 83/36
70/239
4,691,584 A    9/1987 Takaishi
(Continued)

FOREIGN PATENT DOCUMENTS

DE    29505265 U1    7/1995
DE    19908155 A1    8/2000
(Continued)

OTHER PUBLICATIONS

English Translation of DE19908155A1by Total patent Lexis Nexis on Apr. 23, 2015.
(Continued)

*Primary Examiner* — Victor MacArthur
(74) *Attorney, Agent, or Firm* — Woodard, Emhardt, Moriarty, McNett & Henry LLP

(57) ABSTRACT

The invention relates to an actuating unit for a motor vehicle lock, comprising a motor element and a drive for moving the motor element, a Bowden cable connected to the motor element and a connecting element for the Bowden cable. The invention further relates to a method of production. The aim of the invention is to simplify production of an actuating unit having a Bowden cable. According to the invention, the connecting element for the Bowden cable is angular, especially L-shaped, and a leg thereof, in the case of an L shape preferably the long leg thereof, is connected to the remainder of the housing. The angular form or L shape and the connection of one leg of such a shape to the remainder of the housing of the motor element results in a large surface or a
(Continued)

large peripheral edge of the connecting part which can be connected to the remainder of the housing. As a result, the connecting element can be firmly secured to the remainder of the housing such that the latter withstands the forces of a motor element even when the movement of the motor element is not limited with the aid of a microswitch but with the aid of the connecting element.

17 Claims, 1 Drawing Sheet

(51) Int. Cl.
    *E05B 79/20*     (2014.01)
    *E05B 81/24*     (2014.01)
    *F16C 1/14*     (2006.01)
    *E05B 81/28*     (2014.01)
    *E05B 81/06*     (2014.01)

(52) U.S. Cl.
    CPC .............. *F16C 1/262* (2013.01); *E05B 81/06* (2013.01); *E05B 81/28* (2013.01); *F16C 2350/52* (2013.01); *Y10T 29/49945* (2015.01); *Y10T 74/20* (2015.01)

(58) Field of Classification Search
    CPC ..... E05B 2047/0035; E05B 2047/0036; E05C 1/06; F16C 1/145; F16C 1/262; F16C 1/26; F16C 1/02; F16C 1/10
    See application file for complete search history.

(56) References Cited

U.S. PATENT DOCUMENTS

| | | | | |
|---|---|---|---|---|
| 4,840,398 A * | 6/1989 | Matthias | ................ | B60R 21/13 280/756 |
| 4,881,423 A * | 11/1989 | Troiano | ................ | B60R 22/44 180/268 |
| 4,917,418 A * | 4/1990 | Gokee | ................ | B60K 15/05 292/125 |
| 5,048,878 A * | 9/1991 | Takeshita | ............ | E05B 63/0056 292/171 |
| 5,214,332 A | 5/1993 | Tsutsumi | | |
| 5,544,508 A * | 8/1996 | Torkowski | .............. | E05B 77/48 292/144 |
| 5,546,777 A * | 8/1996 | Liu | ......................... | E05B 81/25 292/144 |
| 5,647,234 A * | 7/1997 | Foster | ..................... | E05B 85/14 292/DIG. 25 |
| 5,996,382 A * | 12/1999 | Lehmkuhl | ............... | E05B 79/20 292/DIG. 25 |
| 6,223,622 B1 * | 5/2001 | Ficyk | .................... | E05B 53/005 74/501.6 |
| 8,528,948 B2 * | 9/2013 | Bettin | ..................... | E05B 81/20 292/201 |
| 2008/0047112 A1 * | 2/2008 | Hoekstra | ................. | F16C 1/262 24/457 |
| 2009/0249844 A1 * | 10/2009 | Kinnucan | ............. | E05B 47/026 70/237 |
| 2010/0032965 A1 * | 2/2010 | Kargilis | .................. | E05B 81/14 292/216 |
| 2011/0012380 A1 * | 1/2011 | Bendel | .................... | E05B 81/20 292/341.16 |
| 2011/0074168 A1 * | 3/2011 | Bendel | .................... | E05B 81/20 292/144 |
| 2011/0173892 A1 * | 7/2011 | Bendel | ................. | E05F 15/697 49/349 |
| 2013/0152644 A1 * | 6/2013 | Bendel | ................... | E05B 81/25 70/277 |

FOREIGN PATENT DOCUMENTS

| | | | | |
|---|---|---|---|---|
| DE | 202009010787 U1 | 1/2011 | | |
| DE | 102009036834 A1 * | 2/2011 | .......... | B60N 2/0232 |
| DE | 102009036835 A1 * | 2/2011 | .......... | B60N 2/0232 |
| DE | 102011075611 A1 * | 11/2012 | ............ | E05B 79/20 |
| EP | 764751 A1 | 3/1997 | | |
| JP | 61191779 | 8/1986 | | |

OTHER PUBLICATIONS

English Translation of DE202009010787UA by Total patent Lexis Nexis on Apr. 23, 2015.
English Translation of DE29505265U1 by Total patent Lexis Nexis on Apr. 23, 2015.
English Translation of EP764751A1 by Total patent Lexis Nexis on Apr. 23, 2015.

* cited by examiner

ACTUATING UNIT FOR A MOTOR VEHICLE LOCK AND CORRESPONDING METHOD OF PRODUCTION

CROSS-REFERENCE TO RELATED APPLICATIONS

This application is the U.S. national stage application of International Patent Application No. PCT/DE2013/000508, filed Sep. 6, 2013, which claims priority of German Application No. 10 2012 218 650.6, filed Oct. 12, 2012, which are both hereby incorporated by reference.

BACKGROUND

The invention relates to an actuating unit for a motor vehicle door lock, comprising a motor element and a drive for moving the motor element, a Bowden cable connected to the motor element and a connecting element for the Bowden cable. The invention further relates to method of production.

An actuating unit comprises a drive, in particular an electric motor and a motor element, which can be moved by the drive. In general, the motor element can be moved by the drive to and fro between two positions or end positions and generally linearly. The drive and the motor element are located in the housing. The connecting element is part of the housing.

An actuating unit for a motor vehicle door lock can, in particular, be part of a motorized servo locking system, for instance for a tailgate lock. In such an actuating unit for a motor vehicle door lock, the motor vehicle door lock and the motor element are connected by means of a Bowden cable. The lock and the motorized drive and motor element are, in most cases, arranged at two different locations in the motor vehicle door for space reasons.

SUMMARY

The invention relates to the connection of the Bowden cables in the area of the drives. Generally, the actuating unit transfers a tensile force via the Bowden cable to a mechanism, such as a closing mechanism. The core of the Bowden cable can be moved in and out of the sheath or cover of the Bowden cable.

Printed document DE 20 2009 010 787 U1 discloses an actuating unit with a motor element and a drive for moving the motor element. A Bowden cable is connected to the motor element. The housing includes a connecting element through which the core of the Bowden cable extends. The figure provided in this document shows a micro switch of the actuating unit. Such a micro switch is usually used, in order to determine an end position of the motor element of the actuating unit and to restrict the movement of the motor element. Without such a micro switch, a movement of such a motor element is no longer restricted by a micro switch but by the connecting element in an end position. Consequently, high forces of approx. 250 N can be exerted on the connecting element. It has been shown that a connecting element, as disclosed in printed document DE 20 2009 010 787 U1 cannot withstand such high forces, irrespective of whether or not the connecting element is connected to the remainder of the housing by for instance gluing and/or bolting.

Unless specified otherwise below, the above characteristics of an actuating unit can either individually or jointly be part of the invention.

It is the task of the invention to reduce the production cost for an actuating unit with a Bowden cable.

In order to solve the task, an actuating unit with a motor element and a drive for moving the motor element is provided. A Bowden cable is connected to the motor element. A connecting element for the Bowden cable is angular, especially L-shaped and a leg thereof, in the case of an L shape preferably the long leg thereof, is connected to the remainder of the housing.

The angular form or L shape and the connection of one leg of such a shape to the remainder of the housing of the motor element results in a large surface or a large peripheral edge of the connecting element which can be connected to the remainder of the housing. As a result, the connecting element can be securely fixed to the remainder of the housing in such a way that the forces of a motor element can also be absorbed when the movement of the motor element is not restricted with the aid of a micro switch but by the connecting element. As a result of the angular form or L form, the required installation space can be kept to a minimum. As no micro switch or electrics or electronics are required, the technical production effort can be reduced. No installation space has to be provided for a micro switch, electrics or electronics, reducing the installation space compared to prior art embodiments. At the same time, this results in a reduction of weight.

In one embodiment of the invention, the motor element contains a wider area serving as a stop at the end facing the Bowden cable. As a result, the force that can be transferred to the connecting element via the motor element, is evenly distributed. This improves the mechanical stability in such a way that no micro switch including electrics and electronics for restricting the movement of the motor element is required. Preferably, the wider area contains a surface facing the Bowden cable, adapted to the inside of the connecting element, serving as a restriction and/or a circular base, in order to provide a particularly suitable wider area of low weight and compact design, able to uniformly transfer the force onto the connecting element.

In one embodiment of the invention, the motor element is made of metal. The wider area, i.e. the stop of the motor element, can also be made of metal. This further improves the mechanical stability in such a way that no micro switch including electrics and electronics for restricting the movement of the motor element is required This embodiment also provides an adequately stable press fit between the motor element and core of the Bowden cable in order to connect the motor element and the core in a particularly easy technical manner.

In one embodiment of the invention, the core of the Bowden cable is connected with the motor element by pressing. This results in a press fit between the motor element and core of the Bowden cable. In particular the end of the motor element facing the connecting element contains a hole into which the core of the Bowden cable extends. The end of the motor element containing the opening or hole is then press fitted in such a way that the core of the Bowden cable is positively connected to the motor element. This embodiment is particularly space saving and is technically easy to implement. The connection produced between the motor element and Bowden cable is so firm that it can withstand any arising forces even if no micro switch for restricting the movement of the motor element is provided.

In one embodiment of the invention, the motor element is a spindle, moved linearly by the drive.

In one embodiment of the invention, the part of the housing connected to the connecting element is a single piece. This further improves stability so that no micro switch for limiting the movement of the motor element is required.

In one embodiment of the invention, the connecting element is at least partially connected to the remainder of the housing by bolting. The connecting element includes, in particular one or several internal threads, into which a bolt is screwed. Each bolt extends through a respective opening of the remainder of the housing so that the respective parts of the housing are bolted together. The parts can also be riveted instead of bolted together. Riveting is possible if the housing parts no longer have to be separated from each other. This design increases mechanical stability so that no micro switch for limiting the movement of the motor element is required. The housing parts can also be glued or welded where a subsequent release of the connection is not intended.

In one embodiment of the invention, the unit contains a hinged connection, connecting the connecting element to the remainder of the housing. Preferably, the hinge is provided at the free end of the leg of the angular form connected to the remainder of the housing. The mechanical stability can be improved further as no micro switch for restricting the movement of the motor element is required. With this design, the actuating unit is also produced particularly easily and quickly.

In one embodiment of the invention, the drive or motor of the actuating unit is accommodated in the part of the housing containing the leg of the connecting element connected to another part of the housing. The motor and a motor axis extend, in particular, vertical to the longitudinal direction of the motor element, i.e. in particular, vertically to the longitudinal axis of a spindle. In this case, the motor element and axle of the motor form a right angle. This embodiment furthermore contributes to keeping the installation space to a minimum.

In one embodiment of the invention, the connecting element directly serves to accommodate the sheath or cover of the Bowden cable. The connecting element includes, in particular, a ring-like seat, accommodating the sheath or cover of the Bowden cable. In this way, the position of the Bowden cables is advantageously stabilised. The core of the Bowden cable extends through the connecting element. The connecting element contains a respective opening or hole. Technically, this design can be achieved particularly easily with the advantage of a compact installation space and low weight.

According to the invention, the housing of the motor element serves as a counter bearing or end stop for the motor element. As a result, a micro switch for limiting the movement of the motor element can be advantageously omitted.

The motor element with Bowden cable according to the invention is, in particular, part of a closing aid of a motor vehicle. A closing aid of a motor vehicle can automatically move the locking mechanism of a lock from an intermediate into a final locking position.

For installation, the Bowden cable sheath and the Bowden cable core is preferably inserted through the opening of the connecting element and the motor and gearbox connection, such as a worm gear are only permanently connected to the core of the Bowden cable after insertion of the Bowden cable in the opening of the connecting element and, in particular, by press fitting. As a result, a single-piece connecting element can be provided that can easily absorb the generated forces without the need for said micro switch.

The invention is explained in more detail in FIGS. 1 and 2 with reference to an advantageous embodiment, in which:

DETAILED DESCRIPTION OF THE DRAWINGS

Figure 1:
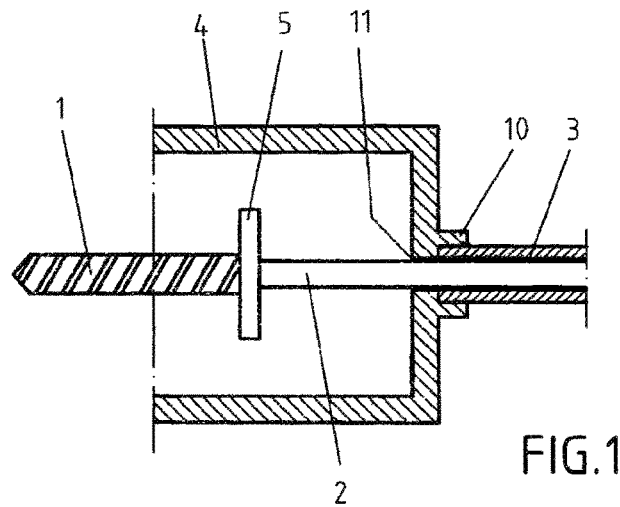
FIG. 1: shows a section of an actuating unit

FIG. 1 shows a section of an actuating unit with a motor element 1, in form of a spindle, which can be linearly moved to and fro between two end positions by a drive 20 namely an electric motor. A Bowden cable is connected to spindle 1, containing a core 2 and a sheath 3. A leg 4 of an angular connecting element for the Bowden cable is connected to the remainder of the housing with its other leg not shown in FIG. 1. The leg 4 of the connecting element contains a ring-like seat 10 surrounding the sheath or cover 3 of the Bowden cables. The position of the sheath 3 of the Bowden cable is thus advantageously stabilised. The core 2 of the Bowden cable extends through an adapted opening 11 at the free end of the leg 4.

On the end facing the connecting element 4, the motor element 1 contains a disc-like widened area 5, serving as a stop. As a result, the force that can be transferred to the connecting element 1 by the motor element in an end position, is evenly transferred. The base of the widened area 5 is circular. The inner wall adjoining the opening 11, is coplanar. The surface of the widened area 5, facing this inner wall is also coplanar. The two surfaces are thus adapted to each other.

Spindle 1, namely the motor element, is made of metal. The end with the widened area 5 contains a hole not shown into which a core 2 of the Bowden cable extends. The core 2 is secured in the hole by press fitting. The core 2 of the Bowden cable is thus connected to motor element 1 by press fitting.

Figure 2:
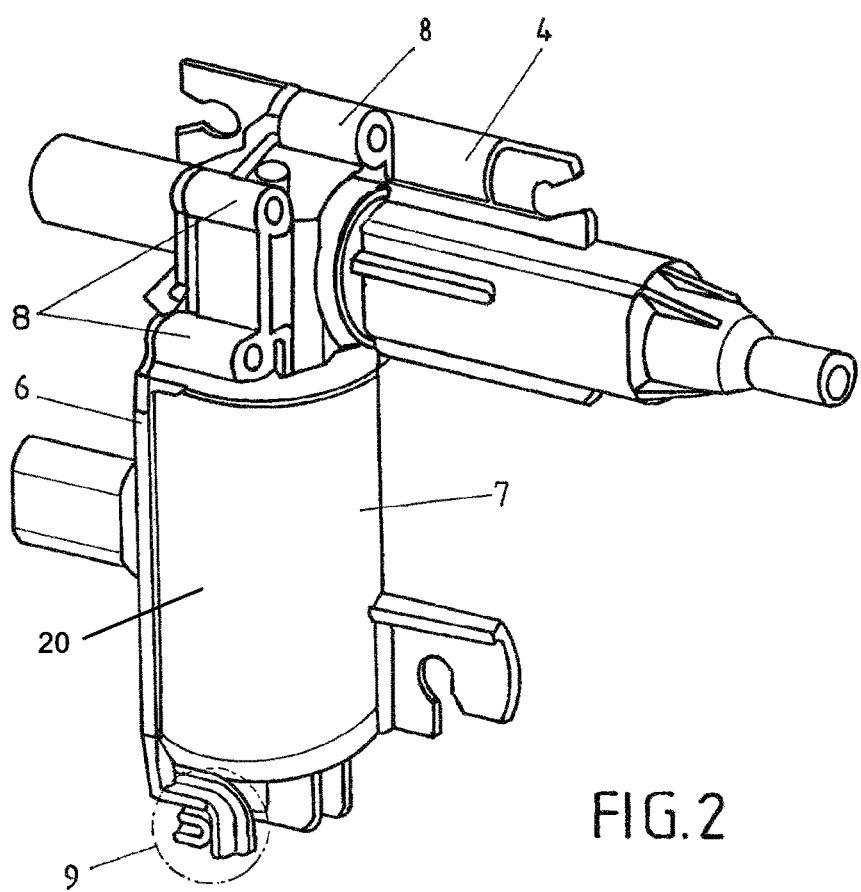
FIG. 2: shows the housing of an actuating unit

FIG. 2 shows a housing of such an actuating unit with a single-piece angular connecting element and a further single-piece rear housing part 6. A leg 7 of the connecting element is, amongst other things, connected to the other part 6 of the housing by bolting. The connecting element 4 contains housing areas 8 with internal thread, in which in each case a bolt has been inserted from the rear in order to bolt together the two housing parts 6 and 8.

The unit also contains a hinge 9, connecting the connecting element with the remaining rear-sided housing part 6. The hinge 9 is arranged at the free end of the leg 7, serving to connect the two housing parts.

The motor of the actuating unit is accommodated in part of the housing containing the leg 7 of the connecting element.

LIST OF REFERENCE NUMBERS

1: Spindle
2: Core of a Bowden cable
3: Sheath of a Bowden cables
4: Leg of a connecting element
5: Widened area
6: Rear-sided housing part
7: Leg of connecting element
8: Housing area with internal thread
9: Hinge
10: Ring-shaped seat
11: Opening in housing part

The invention claimed is:

1. An actuating unit, comprising:
   a motor element;
   a drive for moving the motor element;
   a housing sized to receive the motor element, the housing forms a portion of a connecting element;
   a Bowden cable connected to the motor element, the Bowden cable having a core that spans along a length of the Bowden cable;
   the connecting element configured to receive the Bowden cable, wherein the connecting element is angular to form an L-shape, the connecting element including a longer leg and a shorter leg that are formed in one piece, the longer leg is connected to a portion of the housing to cover the motor element wherein the motor element is configured to move linearly relative to the longer leg; and
   wherein the motor element has a widening section configured to serve as a stop for an internal wall of the connecting element with an opening for the core of the Bowden cable, the widening section defines a hole into which the core of the Bowden cable extends and is connected to the motor element by press fitting.

2. The actuating unit according claim 1, characterized in that the motor element being made of metal.

3. The actuating unit according to claim 1, characterized in that the housing of the actuating unit consisting of no more than 2 parts.

4. The actuating unit according to claim 3, characterized in that the housing parts are connected to each other by bolts and/or a hinge.

5. The actuating unit according to claim 3, characterized in that a hinge is provided at a free end of the longer leg of the connecting element, connected to another housing part.

6. The actuating unit according to claim 1, characterized in that the drive of the actuating unit is accommodated in part of the housing containing the longer leg of the connecting element, connected to another housing part.

7. The actuating unit according to claim 1, characterized in that the connecting element contains a ring-shaped seat for a sheath of the Bowden cable.

8. The actuating unit according to claim 1, characterized in that the connecting element serves as a stop restricting the movement of the motor element.

9. A method for installing the actuating unit according to claim 1, comprising: inserting a core of the Bowden cable through the opening in the connecting element, pushing an inserted end of the core into an opening in the motor element, and compressing the opening to form a press-fit connection.

10. The actuating unit according to claim 1, characterized in that the motor element being made of metal.

11. The actuating unit according to claim 1, characterized in that the housing of the actuating unit consisting of no more than 2 parts.

12. The actuating unit according to claim 11, characterized in that the housing parts are connected to each other by bolts and/or a hinge.

13. The actuating unit according to claim 12, characterized in that a drive of the actuating unit is accommodated in part of the housing containing the longer leg of the connecting element, connected to another housing part.

14. The actuating unit according to claim 13, characterized in that the connecting element contains a ring-shaped seat for a sheath of the Bowden cable.

15. The actuating unit according to claim 14, characterized in that the connecting element serves as a stop restricting the movement of the motor element.

16. The actuating unit according to claim 1, wherein the Bowden cable is configured to move linearly relative to the longer leg.

17. The actuating unit according to claim 1, wherein the connecting element defines an opening that receives an inserted end of a core of the Bowden cable, and wherein the opening is compressed to form a press-fit connection between the connecting element and the core of the Bowden cable.

* * * * *